United States Patent
Suga

(10) Patent No.: US 7,337,203 B2
(45) Date of Patent: Feb. 26, 2008

(54) EXPONENT CALCULATION APPARATUS AND METHOD, AND PROGRAM

(75) Inventor: Yuji Suga, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 692 days.

(21) Appl. No.: 10/692,493

(22) Filed: Oct. 24, 2003

(65) Prior Publication Data
US 2004/0139139 A1 Jul. 15, 2004

(30) Foreign Application Priority Data
Oct. 29, 2002 (JP) ............................. 2002-314595

(51) Int. Cl.
*G06F 7/38* (2006.01)
(52) U.S. Cl. ..................... 708/277; 708/491; 708/606
(58) Field of Classification Search ................ 708/277, 708/491, 606
See application file for complete search history.

(56) References Cited

U.S. PATENT DOCUMENTS 5,195,052 A * 3/1993 Karim ....................... 708/606
6,317,769 B1 * 11/2001 Kobayashi et al. .......... 708/491
6,567,832 B1 * 5/2003 Ono et al. ................... 708/606
6,748,412 B2 * 6/2004 Ruehle ........................ 708/606
2004/0236813 A1 * 11/2004 Grinchuk ..................... 708/492

* cited by examiner

*Primary Examiner*—Chuong D Ngo
(74) *Attorney, Agent, or Firm*—Canon USA, Inc., IP Division

(57) ABSTRACT

An exponent calculation apparatus calculates $x^e$ based on input two integers x and e. A pre-calculation module pre-calculates $x^{\{l\_i\}}$ for each of candidate exponents $\{l\_i\}$ ($0 \leq i \leq L-1$) stored in a candidate exponents storing unit, the number of the candidate exponents being L, and stores the obtained values $x^{\{l\_i\}}$ in a pre-calculated values storing unit. A dividing module divides the integer e into a plurality of values $\{f\_i\}$ ($0 \leq i \leq F-1$) so that each of the values $\{f\_i\}$ corresponds to one of the candidate exponents $\{l\_i\}$. A sequential processing module sequentially updates a calculation result c, which is stored in a calculation result storing unit, for each of the values $\{f\_i\}$ by using each of the values $x^{\{l\_i\}}$. The updated calculation result c for each of the values $\{f\_i\}$ is output as $x^e$. Accordingly, the amount of pre-calculation and table size can be reduced and thus the number of calculations can be reduced.

17 Claims, 14 Drawing Sheets

FIG. 2

|   | PROCESS 2-1 | PROCESS 2-2 |
|---|---|---|
| 1 |  | $x$ |
| 1 | $(x)^2 = x^2$ | $x^2 \cdot x = x^3$ |
| 0 | $(x^3)^2 = x^6$ | $x^6$ |
| 1 | $(x^6)^2 = x^{12}$ | $x^{12} \cdot x = x^{13}$ |
| 1 | $(x^{13})^2 = x^{26}$ | $x^{26} \cdot x = x^{27}$ |
| 1 | $(x^{27})^2 = x^{54}$ | $x^{54} \cdot x = x^{55}$ |

FIG. 3

|   | PROCESS 2-1 | PROCESS 2-2 |
|---|---|---|
| 11 |  | $x^3$ |
| 01 | $(x^3)^4 = x^{12}$ | $x^{12} \cdot x = x^{13}$ |
| 11 | $(x^{13})^4 = x^{52}$ | $x^{52} \cdot x^3 = x^{55}$ | e= 1101101110001010001

| | STEP S503 PROCESS 1 | PROCESS 2 |
|---|---|---|
| 1 | | $x^1$ |
| 101 | $(x^1)^8 = x^8$ | $x^8 \cdot x^5 = x^{13}$ |
| 101 | $(x^{13})^8 = x^{104}$ | $x^{104} \cdot x^5 = x^{109}$ |
| 1 | $(x^{109})^2 = x^{218}$ | $x^{218} \cdot x^1 = x^{219}$ |
| 1 | $(x^{219})^2 = x^{438}$ | $x^{438} \cdot x^1 = x^{439}$ |
| 0 | $(x^{439})^2 = x^{878}$ | $= x^{878}$ | e=1101101110001010001

|     |   | f_i, b_i | f_(i+1), b_(i+1) | sht |
|-----|---|----------|------------------|-----|
| 100 |   | 1, 1     | –                | 2   |
| 101 |   | 101, 3   | –                | 0   |
| 110 | 0 | 11, 2    | –                | 2   |
|     | 1 | 1, 1     | 101, 3           | 0   |
| 111 | 0 | 101, 1   | 1, 1             | 2   |
|     | 1 | 101, 1   | 101, 3           | 0   | e= 1101101111001010001

| | STEP S503 PROCESS 1 | PROCESS 2 |
|---|---|---|
| 1101 | | $x^{13}$ |
| 1011 | $(x^{13})^{16} = x^{208}$ | $x^{208} \cdot x^{11} = x^{219}$ |
| 11 | $(x^{219})^4 = x^{876}$ | $x^{876} \cdot x^3 = x^{879}$ |
| 0 | $(x^{879})^2 = x^{1758}$ | $= x^{1758}$ |
| 0 | $(x^{1758})^2 = x^{3516}$ | $= x^{3516}$ |
| 101 | $(x^{3516})^8 = x^{28128}$ | $x^{28128} \cdot x^5 = x^{28133}$ |
| ... | ... | ... |

EXPONENT CALCULATION APPARATUS AND METHOD, AND PROGRAM

BACKGROUND OF THE INVENTION

1. Field of the Invention

The present invention relates to an exponent calculation apparatus and method for performing exponent calculation including modular exponent calculation.

2. Description of the Related Art

Modular exponent calculation for calculating $x^e$(mod N) is used in RSA cryptosystem/signature, ElGamal cryptosystem, DSA signature, Diffie-Hellman key agreement method, and so on. The modular exponent calculation is used not only in signature and decryption of files but also in security for communication paths, such as SSL. Calculation must be performed interactively in response to a communication request, and the processing efficiency has a great effect on cipher processing time.

Modular exponent calculation includes: a) modular square calculation $x^2$(mod N); and b) modular multiplication calculation xu(mod N). $X^e$(mod N) is calculated by using a given e by a) and b). Some methods for increasing entire processing speed by reducing the number of multiplications a) and b) have been proposed.

An addition chain is a sequence of integers starting from $a_1=1$ to $a_n=e$, where $a_i$ satisfies the sum of previous numbers ($a_i=a_j+a_k$ (j, k<i)). For example, when e=55, the addition chain is {1, 2, 3, 6, 12, 13, 26, 27, 54, 55}. This means that $x^{55}$ can be calculated by performing calculations a) and b) in the order of $x \to x^2 \to x^3 \to x^6 \to x^{12} \to x^{13} \to x^{26} \to x^{27} \to x^{54} \to x^{55}$. By using this method, the calculation amount can be reduced compared to a case where only b) is used: {1, 2, 3, 4, ..., 52, 53, 54, 55}. In this way, an algorithm for finding a shorter addition chain for a given exponent e (55 in the above example) is effectively used.

<Binary Method>

Binary Method is an algorithm based on the above-described motivation, and is introduced in D. E. Knuth. The Art of Computer Programming: Seminumerical Algorithms, volume 2, Reading, Mass.: Addison-Wesley, Second edition (1981).

The Binary Method is an algorithm for performing the following processing. A given exponent e (bit length is k) is represented in binary notation: $\Sigma_{i=0, ..., k-1} 2^{i*}e\_i$ ($e\_i$ is 0 or 1). An algorithm in which x, e, and N are input and $C=x^e$(mod N) is output is as follows:

1) if $e\_(k-1)=1$ then C:=x else C:=1
2) for i=k-2 down to 0
   2-1) C:=C*C(mod N)
   2-2) if $e\_i=1$ then C:=C*x(mod N)
3) return C In the above algorithm, "for" in 2) represents that 2-1) and 2-2) are loop-processed while a variable i is reduced one after another from k-2 to 0. FIG. 2 shows a process of calculating $x^{55}$(mod N) by using the Binary Method when e=55. In this case, the addition chain is {1, 2, 3, 6, 12, 13, 26, 27, 54, 55}.

<m-ary Method>

The m-ary Method is an expansion of the Binary Method, in which processing of 2 bits or more is performed at a time. An algorithm in which x, e, N are input and $C=x^e$(mod N) is output is described below. However, the bit length of a given exponent e is k, and e is divided into $r(=\log_2 m)$ bit strings $F\_0, \ldots,$ and $F\_(s-1)$, the number of the bit strings being s (s is an integer smaller than k/r).

0) $x^w$(mod N) is pre-calculated for w=2, ..., m-1
1) C:=$x\hat{}\{F\_(s-1)\}$ (mod N) ("^" represents exponentiation)
2) for i=s-2 down to 0
   2-1) C:=$C^m$(mod N)
   2-2) if $F\_i \neq 0$ then C:=$C*x\hat{}\{F\_i\}$ (mod N)
3) return C The m-ary Method is referred to as Quaternary Method when m=4. FIG. 3 shows a process according to the Quaternary Method when e=55. "e" in binary notation is $(110111)_2$. By dividing this value by r=2 bits, $(11\ 01\ 11)_2$ is obtained, which is processed in the manner shown in FIG. 3. In this case, the addition chain is {1, 2, 3, 6, 12, 13, 26, 52, 55}. In this method, the length of addition chain is shorter by one element than that in the Binary Method. Accordingly, the amount of modular calculation for calculating $x^{55}$ can be reduced.

Furthermore, many improved methods, such as Slide Window Techniques, have been proposed as an expansion of the m-ary Method. In the Slide Window Techniques, the bit length used at a time in the process 2) of the algorithm can be changed, so as to reduce the amount of pre-calculation, which corresponds to the process 0) of the algorithm. Accordingly, the calculation amount and a region for storing pre-calculation result (referred to as table) can be reduced.

In the above-described prior arts, pre-calculation need not be performed and thus a table for storing pre-calculation result is not necessary in the Binary Method. However, in the Binary Method, when the number of 1 in an exponent e represented in binary notation is large, the amount of calculation is disadvantageously increased. On the other hand, in the Quaternary Method and the Slide Window Techniques, the calculation amount can be reduced. However, referring to a table is needed and the amount of pre-calculation is disadvantageously increased.

SUMMARY OF THE INVENTION

It is an object of the present invention to provide an exponent calculation apparatus in which the amount of pre-calculation and the size of table can be reduced and the number of calculations can be reduced.

According to one aspect, the present invention which achieves these objectives relates to an exponent calculation apparatus for calculating $x^e$ based on two integers x and e. The apparatus includes an input unit for inputting the two integers x and e; a candidate exponents storing unit for storing candidate exponents $\{l\_i\}$ ($0 \leq i \leq L-1$), the number of the candidate exponents being L; a pre-calculation unit for pre-calculating $x\hat{}\{l\_i\}$ for each of the candidate exponents $\{l\_i\}$, which are stored in the candidate exponents storing unit, based on the input integer x; a pre-calculated values storing unit for storing the values $x\hat{}\{l\_i\}$ obtained by the pre-calculation; a dividing unit for dividing the input integer e into a plurality of values $\{f\_i\}$ ($0 \leq i \leq F-1$) so that each of the values $\{f\_i\}$ corresponds to one of the candidate exponents $\{l\_i\}$; a calculation result storing unit for storing a calculation result c; a sequential processing unit for sequentially updating the calculation result c for each of the divided values $\{f\_i\}$ ($0 \leq i \leq F-1$) by using each of the pre-calculated values $x\hat{}\{l\_i\}$; and an output unit for outputting the updated calculation result c for each of the values $\{f\_i\}$ as $x^e$.

According to another aspect, the present invention which achieves these objectives relates to an exponent calculation apparatus for calculating $x^e$(mod N) based on three integers x, e, and N. The apparatus includes an input unit for inputting the three integers x, e, and N; a candidate exponents storing unit for storing candidate exponents $\{l\_i\}$ ($0 \leq i \leq L-1$), the number of the candidate exponents being L; a pre-calculation unit for pre-calculating $x^{\{l\_i\}}$ for each of the candidate exponents $\{l\_i\}$, which are stored in the candidate exponents storing unit, based on the input integer x; a pre-calculated values storing unit for storing the values $x^{\{l\_i\}}$ obtained by the pre-calculation; a dividing unit for dividing the input integer e into a plurality of values $\{f\_i\}$ ($0 \leq i \leq F-1$) so that each of the values $\{f\_i\}$ corresponds to one of the candidate exponents $\{l\_i\}$; a calculation result storing unit for storing a calculation result c; a sequential processing unit for sequentially updating the calculation result c for each of the divided values $\{f\_i\}$ ($0 \leq i \leq F-1$) by using each of the pre-calculated values $x^{\{l\_i\}}$; and an output unit for outputting the updated calculation result c for each of the values $\{f\_i\}$ as $x^e \pmod N$.

According to still another aspect, the present invention which achieves these objectives relates to an exponent calculation method for calculating $x^e$ based on two integers x and e. The method includes an input step of inputting the two integers x and e; a pre-calculation step of pre-calculating $x^{\{l\_i\}}$ for each of candidate exponents $\{l\_i\}$ ($0 \leq i \leq L-1$) stored in a candidate exponents storing unit, the number of the candidate exponents being L, based on the input integer x, and storing the values $x^{\{l\_i\}}$ obtained by the pre-calculation in a pre-calculated values storing unit; a dividing step of dividing the input integer e into a plurality of values $\{f\_i\}$ ($0 \leq i \leq F-1$) so that each of the values $\{f\_i\}$ corresponds to one of the candidate exponents $\{l\_i\}$; a sequential processing step of sequentially updating a calculation result c, which is stored in a calculation result storing unit, for each of the divided values $\{f\_i\}$ ($0 \leq i \leq F-1$) by using each of the pre-calculated values $x^{\{l\_i\}}$; and an output step of outputting the updated calculation result c for each of the values $\{f\_i\}$ as $x^e$.

According to yet another aspect, the present invention which achieves these objectives relates to an exponent calculation method for calculating $x^e \pmod N$ based on three integers x, e, and N. The method includes an input step of inputting the three integers x, e, and N; a pre-calculation step of pre-calculating $x^{\{l\_i\}}$ for each of candidate exponents $\{l\_i\}$ ($0 \leq i \leq L-1$) stored in a candidate exponents storing unit, the number of the candidate exponents being L, based on the input integer x, and storing the values $x^{\{l\_i\}}$ obtained by the pre-calculation in a pre-calculated values storing unit; a dividing step of dividing the input integer e into a plurality of values $\{f\_i\}$ ($0 \leq i \leq F-1$) so that each of the values $\{f\_i\}$ corresponds to one of the candidate exponents $\{l\_i\}$; a sequential processing step of sequentially updating a calculation result c, which is stored in a calculation result storing unit, for each of the divided values $\{f\_i\}$ ($0 \leq i \leq F-1$) by using each of the pre-calculated values $x^{\{l\_i\}}$; and an output step of outputting the updated calculation result c for each of the values $\{f\_i\}$ as $x^e \pmod N$.

According to a further aspect, the present invention which achieves these objectives relates to a computer-readable program for allowing a computer to execute exponent calculation for calculating $x^e$ based on two integers x and e. The program comprises codes for causing the computer to perform an input step of inputting the two integers x and e; a pre-calculation step of pre-calculating $x^{\{l\_i\}}$ for each of candidate exponents $\{l\_i\}$ ($0 \leq i \leq L-1$) stored in a candidate exponents storing unit, the number of the candidate exponents being L, based on the input integer x, and storing the values $x^{\{l\_i\}}$ obtained by the pre-calculation in a pre-calculated values storing unit; a dividing step of dividing the input integer e into a plurality of values $\{f\_i\}$ ($0 \leq i \leq F-1$) so that each of the values $\{f\_i\}$ corresponds to one of the candidate exponents $\{l\_i\}$; a sequential processing step of sequentially updating a calculation result c, which is stored in a calculation result storing unit, for each of the divided values $\{f\_i\}$ ($0 \leq i \leq F-1$) by using each of the pre-calculated values $x^{\{l\_i\}}$; and an output step of outputting the updated calculation result c for each of the values $\{f\_i\}$ as $x^e$.

According to a further aspect, the present invention which achieves these objectives relates to a computer-readable program for allowing a computer to execute exponent calculation for calculating $x^e \pmod N$ based on three integers x, e, and N. The program comprises codes for causing the computer to perform an input step of inputting the three integers x, e, and N; a pre-calculation step of pre-calculating $x^{\{l\_i\}}$ for each of candidate exponents $\{l\_i\}$ ($0 \leq i \leq L-1$) stored in a candidate exponents storing unit, the number of the candidate exponents being L, based on the input integer x, and storing the values $x^{\{l\_i\}}$ obtained by the pre-calculation in a pre-calculated values storing unit; a dividing step of dividing the input integer e into a plurality of values $\{f\_i\}$ ($0 \leq i \leq F-1$) so that each of the values $\{f\_i\}$ corresponds to one of the candidate exponents $\{l\_i\}$; a sequential processing step of sequentially updating a calculation result c, which is stored in a calculation result storing unit, for each of the divided values $\{f\_i\}$ ($0 \leq i \leq F-1$) by using each of the pre-calculated values $x^{\{l\_i\}}$; and an output step of outputting the updated calculation result c for each of the values $\{f\_i\}$ as $x^e \pmod N$.

Other objectives and advantages besides those discussed above shall be apparent to those skilled in the art from the description of preferred embodiments of the invention that follow. In the description, reference is made to accompanying drawings, which form a part thereof, and which illustrate an example of the invention. Such example, however, is not exhaustive of the various embodiments of the invention, and therefore reference is made to the claims that follow the description for determining the scope of the invention.

BRIEF DESCRIPTION OF THE DRAWINGS

FIG. 2 shows a process performed by using Binary Method, which is a known art.

FIG. 3 shows a process performed by using Quaternary Method, which is a known art.

FIG. 8 shows an example of sequential calculation in the first embodiment.

FIG. 11 shows an example of exponent division in a third embodiment.

FIG. 12 is a table showing a pair of $f\_i$ and $b\_i$ for each exponent and variables sht.

FIG. 17 shows an example of sequential calculation in the fifth embodiment.

DESCRIPTION OF THE PREFERRED EMBODIMENTS

Hereinafter, preferred embodiments of the present invention will be described with reference to the attached drawings.

First Embodiment

Figure 1:
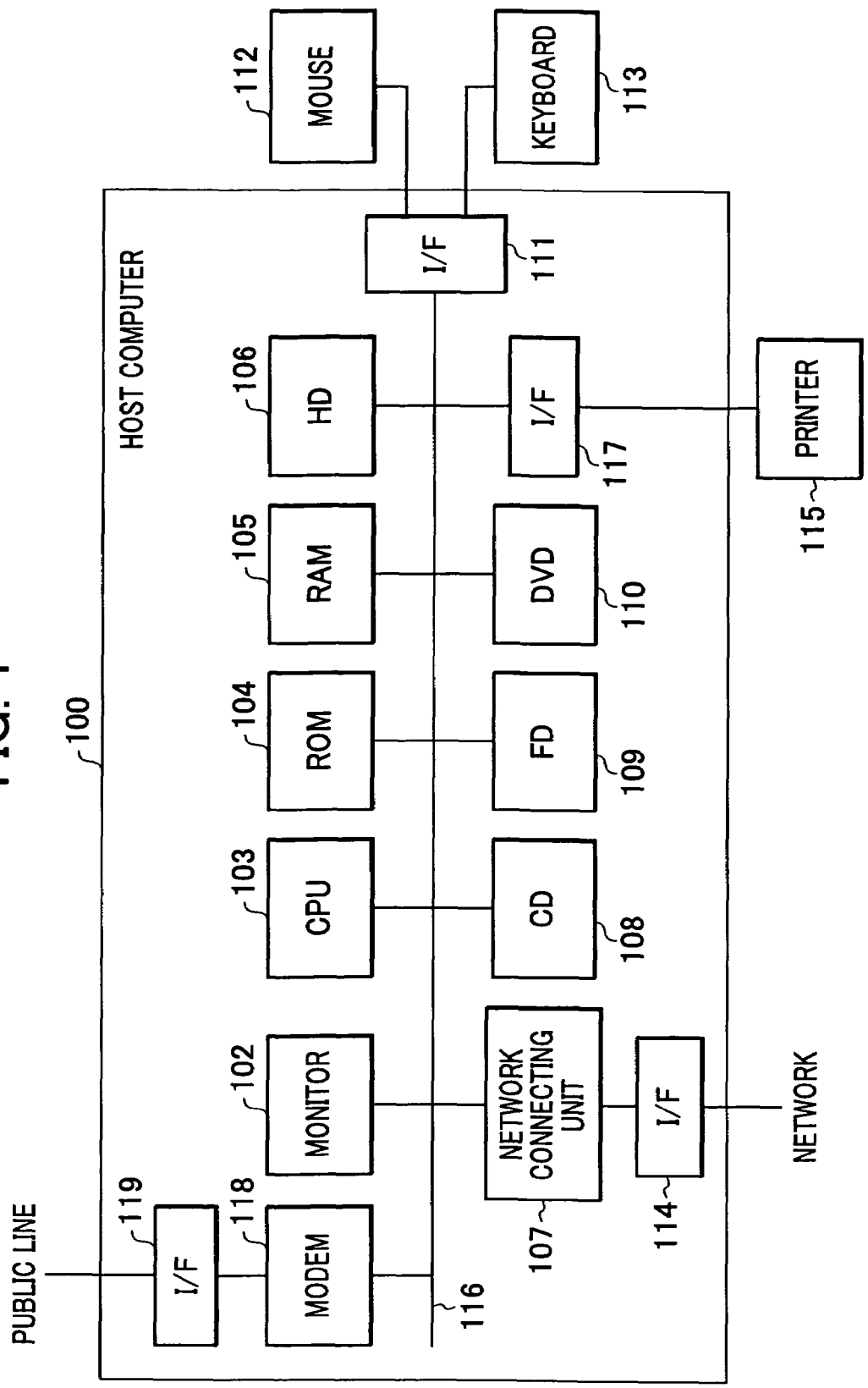
FIG. 1 is a block diagram showing the configuration of an information processor according to the present invention.

The present invention is applied to, for example, an information processor (host computer) 100 shown in FIG. 1. The information processor 100 of this embodiment includes a computer, such as a personal computer, and realizes a function of exponent calculation.

As shown in FIG. 1, the information processor 100 includes a modem 118 for a public line or the like, a monitor 102 serving as a display unit, a CPU 103, a ROM 104, a RAM 105, an HD 106, a network connecting unit 107 for a network, a CD drive 108, an FD drive 109, a DVD drive 110, an interface (I/F) 117 for a printer 115, and an interface (I/F) 111 for a mouse 112 and a keyboard 113, serving as an operation unit. These elements are connected through a bus 116 so that communication can be performed.

The mouse 112 and the keyboard 113 function as the operation unit that is used when a user inputs various instructions to the information processor 100. The input information (operation information) is input to the information processor 100 through the interface 111.

Various pieces of information (text information, image information, etc.) in the information processor 100 can be printed out by the printer 115.

The monitor 102 displays various instructions to a user, text and image information, and so on.

The CPU 103 controls the operation of the entire information processor 100. That is, the CPU 103 reads a processing program (software program) from the HD 106 or the like and executes it, so as to control the entire information processor 100. Specifically, in this embodiment, the CPU 103 reads a processing program for exponent calculation based on secret image information from the HD 106 and executes the program, so that exponent calculation described later is performed.

The ROM 104 stores various processing programs, such as the processing program for exponent calculation, and various types of data.

The RAM 105 is used as a work area for temporarily storing a processing program and information to be processed used for various processing in the CPU 103.

The HD 106 is used as an example of a mass-storage device, and stores text and image information and a processing program, which is transferred to the RAM 105 or the like when processing is executed.

The CD drive 108 reads data stored in a CD (CD-R), which is an external storage medium, and writes data to the CD.

The FD drive 109 reads data stored on a FD, which is an external storage medium, and writes data to the FD, as in the case of the CD drive 108.

The DVD drive 110 reads data stored on a DVD, which is an external storage medium, and writes data to the DVD, as in the case of the CD drive 108 and the FD drive 109.

When an edit program or a printer driver is stored in an external storage medium, such as CD, FD, or DVD, the program or the printer driver may be installed onto the HD 106 and may be transferred to the RAM 105 as required.

The interface (I/F) 111 is used for receiving input from a user through the mouse 112 or the keyboard 113.

The modem 118 is a communication modem, and is connected to an external network through the interface (I/F) 119 and a public line or the like.

The network connecting unit 107 is connected to the external network through the interface (I/F) 114.

Figure 4:
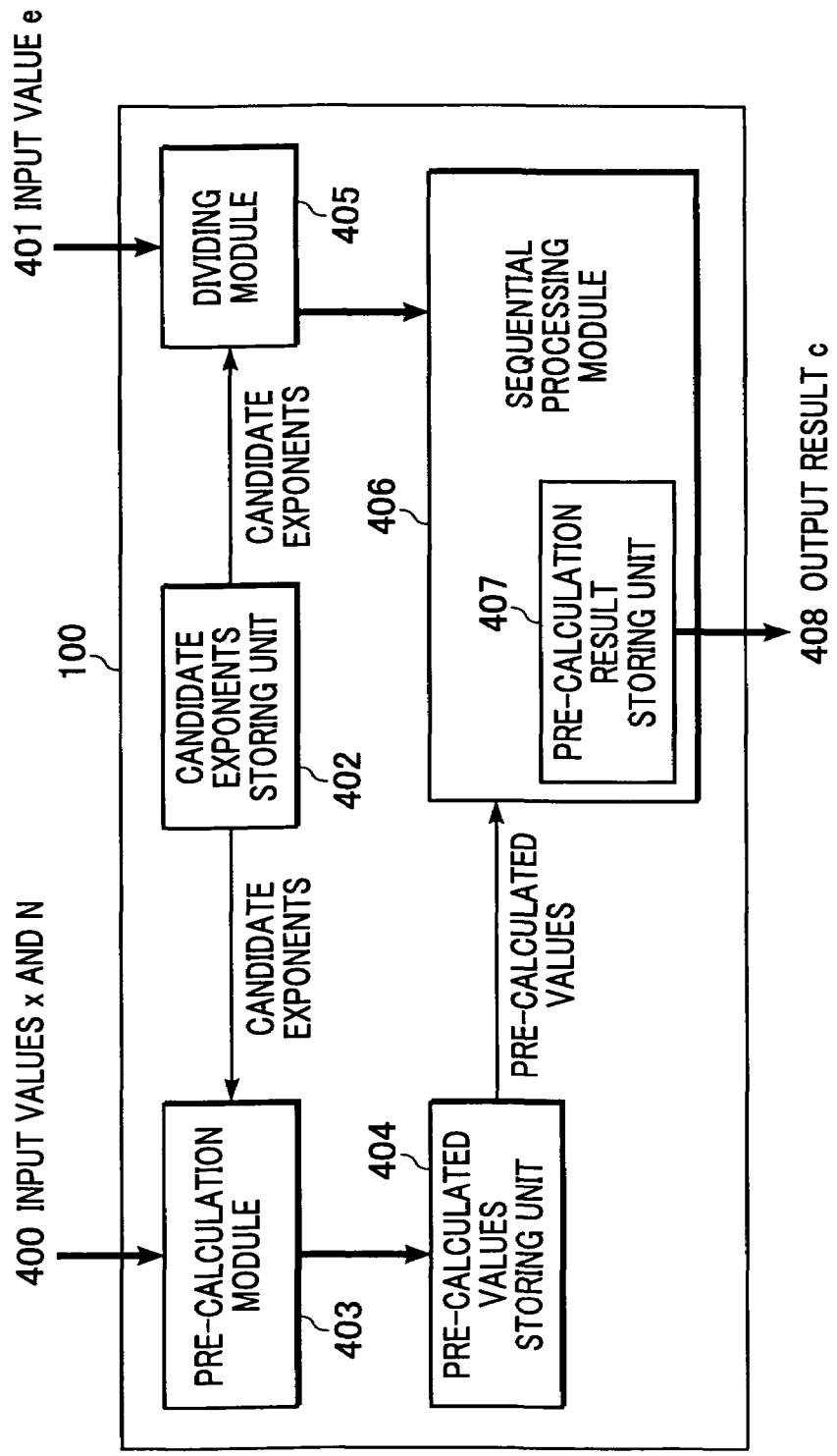
FIG. 4 is a block diagram showing a function structure of an information processor according to a first embodiment.

FIG. 4 shows a featured function of the information processor 100 shown in FIG. 1 (function of the exponent calculation). As shown in FIG. 4, the information processor 100 includes a candidate exponents storing unit 402, a pre-calculation module 403, a pre-calculated values storing unit 404, a dividing module 405, a sequential processing module 406, and a pre-calculation result storing unit 407. Each of the modules 403, 405, and 406 is a function unit (module) that can be realized when the CPU 103 executes a predetermined program.

Values x and N (400) and e (401) are input to the information processor 100. The information processor 100 performs modular exponent calculation by using the input values so as to output a result (408): $c=x^e \pmod N$. When the value N is not input, exponent calculation is performed so as to obtain $c=x^e$, which is an exceptional case in modular exponent calculation. In the first embodiment, modular exponent calculation for calculating $x^e \pmod N$, which is performed by the information processor 100, is described.

Binary numbers, such as (1), (101), (10101), ..., having a form of $1[01]_L$ ($[xy]_i$ represents that xy is repeated i times), are stored in the candidate exponents storing unit 402 in advance. The pre-calculation module 403 performs pre-calculation by using the input values (400) and the binary numbers stored in the candidate exponents storing unit 402, and stores obtained result in the pre-calculated values storing unit 404 in the HD 106. On the other hand, the dividing module 405 divides the input value 401, and stores the input value 401 and the divided values in the HD 106. The sequential processing module 406 sequentially operates the pre-calculation result storing unit 407 in the HD 106 so as to store calculation result 408 in the HD 106. The calculation result 408 is output through the monitor 102, the FD drive 109, the network I/F 114, or the printer 115.

Figure 5:
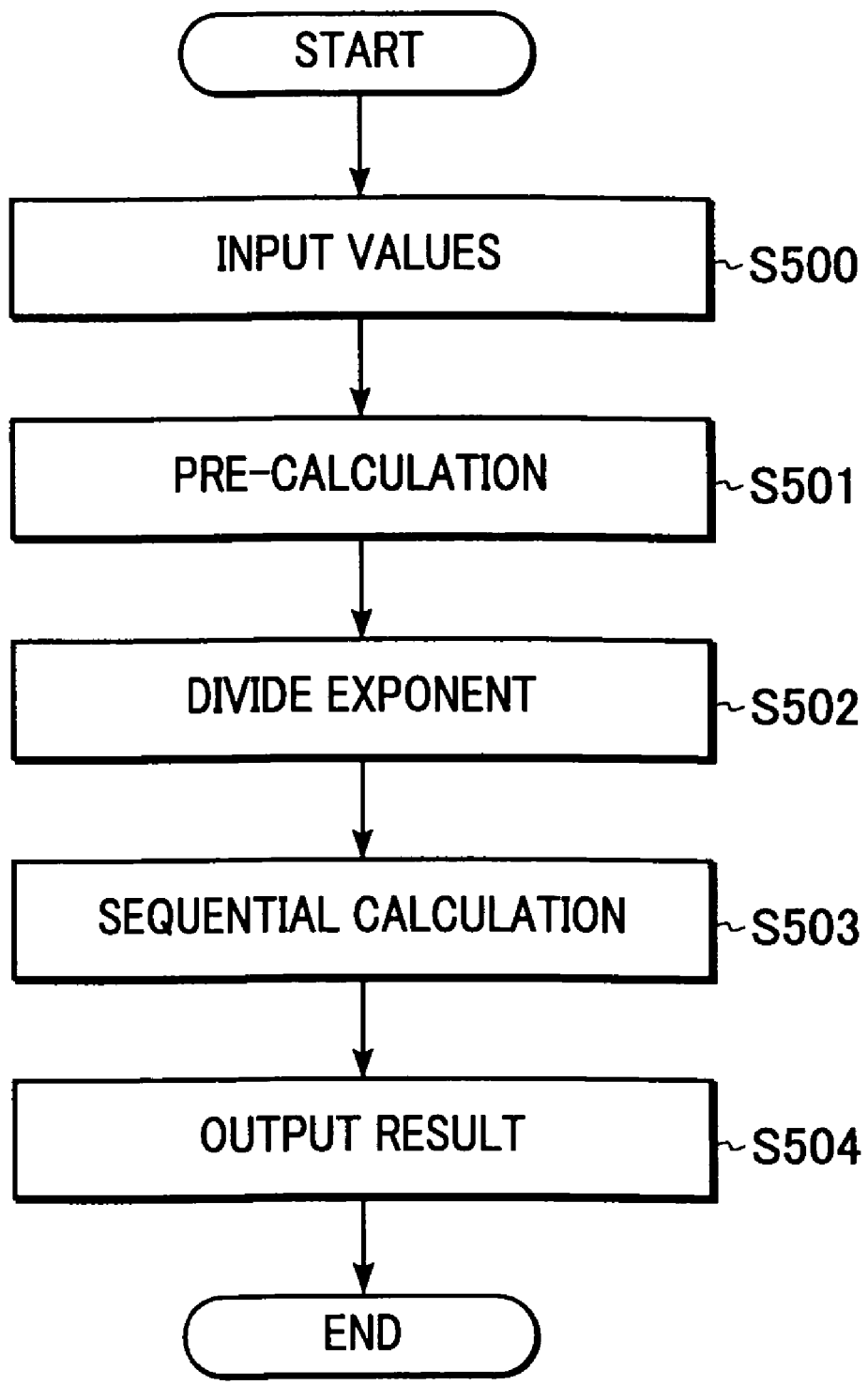
FIG. 5 is a flowchart for illustrating modular exponent calculation in the first embodiment.

FIG. 5 is a flowchart of modular exponent calculation performed by the information processor 100 having the configuration shown in FIG. 4. For example, the CPU 103 reads and executes a processing program corresponding to the flowchart shown in FIG. 5. According to this program, the information processor 100 operates in the following way.

Step S500:

An input value e (bit length is k) is represented in binary notation: $\Sigma_{i=0,\ldots,k-1} 2^i * e\_i$ (e_i is 0 or 1). Input values x, N, and e are stored in the HD 106 or the like.

Step S501:

$x^{\{l\_i\}}$ for each of candidate exponents $\{l\_i\}$ ($0 \leq i \leq L-1$), the number of the candidate exponents being L, stored in the candidate exponents storing unit 402, is pre-calculated based on the input values x an N, and then calculation results are stored in the pre-calculated values storing unit 404.

Step S502:

The exponent e (bit length is k) is divided into a plurality of values $\{f\_i\}$ ($0 \leq i \leq F-1$) so that each of the values $\{f\_i\}$ corresponds to one of the candidate exponents $\{l\_i\}$. At this time, the exponent e is divided so that $k=\Sigma_{i\_0}, \ldots, {}_{F-1}b\_i$ is satisfied, where the bit length of $f\_i$ is $b\_i$.

Step S503:

First, $C:=x^{f\_0} \pmod{N}$ is set in the pre-calculation result storing unit 407. Then, the following processing is sequentially performed for every $f\_i$ ($0 \leq i \leq F-1$). for i=1 to F-1

1) $C:=C^{2^{b\_i}} \pmod{N}$
2) if $f\_i \neq 0$ then $C:=C*x^{f\_i} \pmod{N}$

Step S504:

Output value: $c=x^e \pmod{N}$, which has been obtained in step S503, is output.

Figures 6, 7:
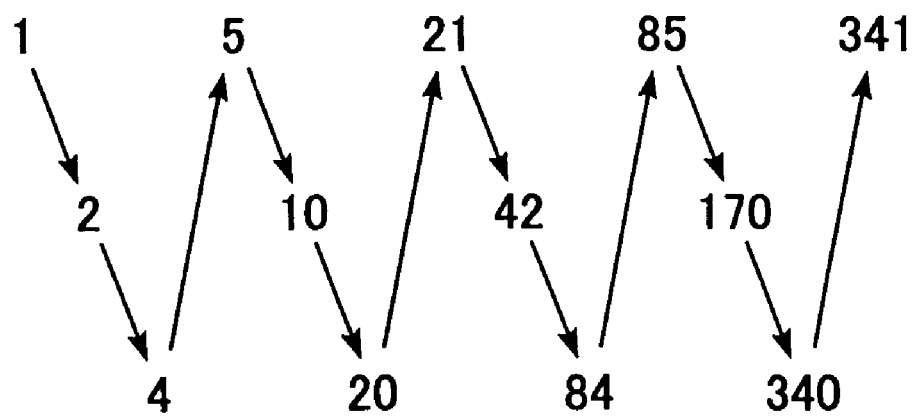
FIG. 6 shows a method for forming an addition chain in the first embodiment.
FIG. 7 shows an example of exponent division in the first embodiment.

FIGS. 6, 7, and 8 show an example of processing when e=1101101110001010001. FIG. 6 shows a method of forming an addition chain in step S501. By performing processing in the following order: $x \to x^2 \to x^4 \to x^5 \to x^{10} \to x^{20} \to x^{21} \to x^{42} \to x^{84} \to x^{85} \to \ldots$, $x^{l\_i}$ for each of the candidate exponents $\{l\_i\}$, such as $x^5$, $x^{21}$, and $x^{85}$, is calculated. FIG. 7 corresponds to step S502, and shows that e is divided into $f\_0=(1)$, $f\_1=(101)$, and so on. FIG. 8 shows a calculation process corresponding to step S503.

Second Embodiment

In the first embodiment, values in a form of $1[01]_L$ are used as candidate exponents. In the second embodiment, a value (11) is also used as a candidate exponent, so as to reduce calculation amount.

Figures 9, 10:
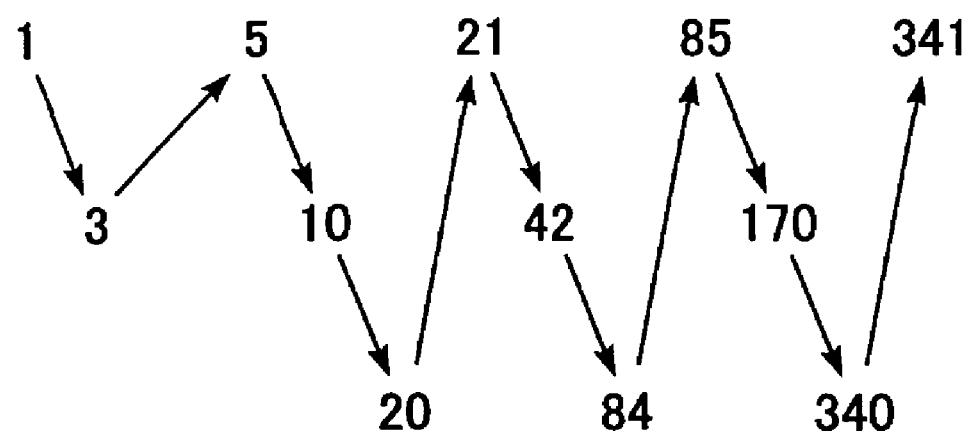
FIG. 9 shows a method for forming an addition chain in a second embodiment.
FIG. 10 shows an example of exponent division in the second embodiment.

FIG. 9 shows an example of processing when e=1101101110001010001, as in the first embodiment, and shows a method of forming an addition chain in the pre-calculation corresponding to step S501. The difference from FIG. 6 is that calculation is performed in the order of $x \to x^3 \to x^5 \to \ldots$, instead of the order of $x \to x^2 \to x^4 \to x^5 \to \ldots$. In this embodiment, the addition chain can be shortened, and the number of divided values of the exponent e can be reduced as shown in FIG. 10. Accordingly, calculation amount of modular exponent calculation can be reduced.

Third Embodiment

In the first and second embodiments, the exponent e is divided so that bit strings of the divided values do not overlap each other. In the third embodiment, (10) in a bit string is divided into (01) and (01) so as to reduce the calculation amount.

FIG. 11 shows an example of processing when e=1101101110001010001, as in the first and second embodiments. In the figure, the last 2 bits 10 of the first 3 bits 110 of the exponent e is divided into 01 and 01, and one of the 01 and 01 is added to the first 1 bit so as to obtain 101. The other 01 is added to the remaining bits. By repeating such a dividing process, incidence of candidate exponents is increased, and thus the number of sequential processings in step S503 can be reduced.

At this time, bit length $b\_i$ of $f\_i$ is not used as it is in step S503, but overlap between values $f\_i$ must be considered. In FIG. 11, the first 7 bits (1101101) is divided in the following way: $f\_0=(101)$, $b\__0=2$, $f\_1=(10101)$, $b\__1=1$, $f\_2=(1)$, and $b\_2=4$. In this way, $b\_i$ must be determined so that the bit lengths match: $b\_0+b\_1+b\_2=7$. A value obtained by subtracting a bit length overlapping with a next $f\_(i+1)$ from the bit length of an $f\_i$ may be used as $b\_i$.

Figure 13:
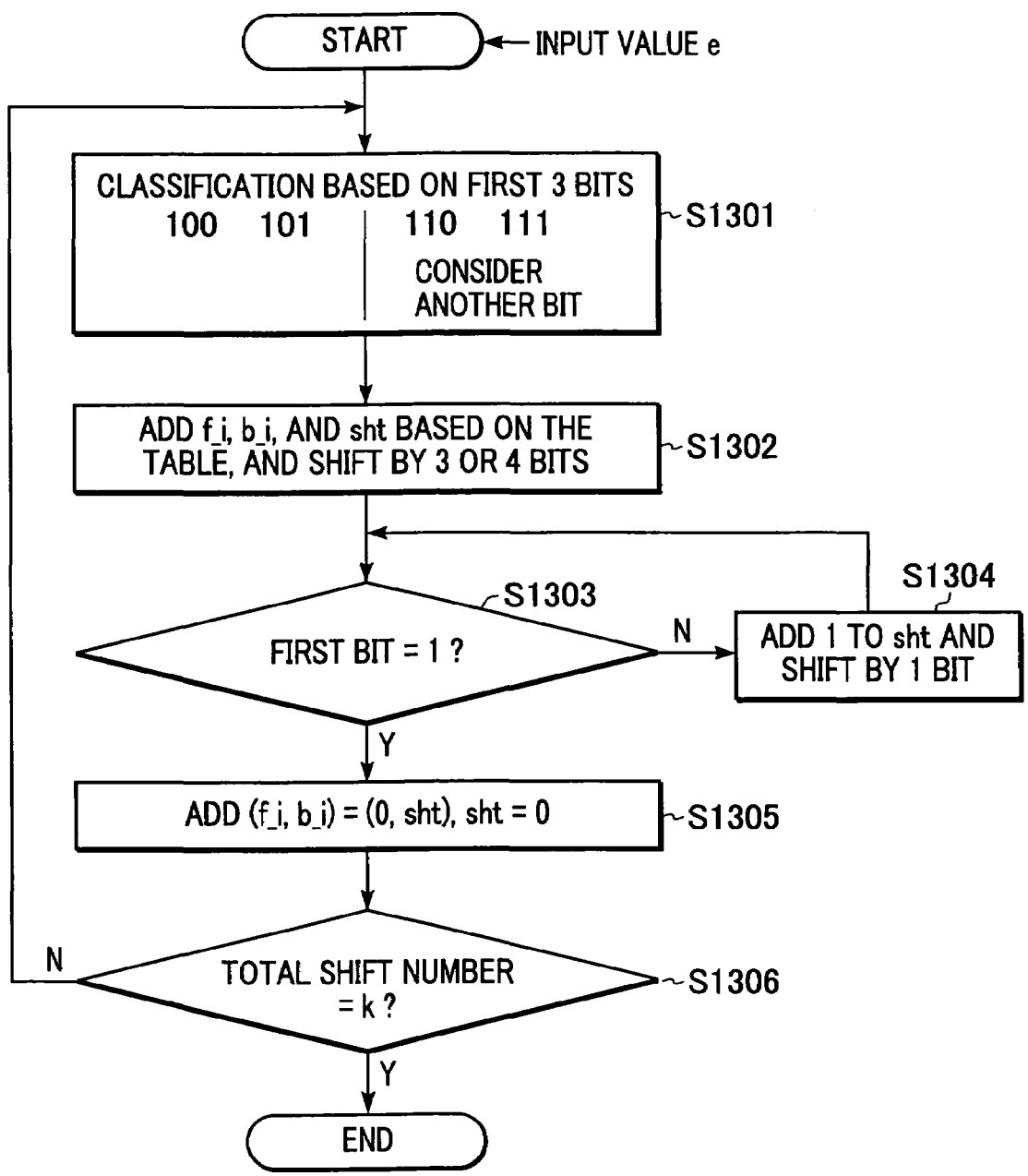
FIG. 13 is a flowchart showing a process of calculating b_i.

As an example, a case where an input value e is processed when candidate exponents are (0), (1), (11), and (101) is described. FIG. 12 shows a table of a pair of $f\_i$ and $b\_i$ for each exponent and variables sht. FIG. 13 shows a flowchart of a process of obtaining $b\_i$.

In step S1301, the process is classified based on the first 3 bits of the input value e. When the first 3 bits are 110 or 111, another 1 bit is read, and processing is performed according to FIG. 12. In step S1302, $f\_i$ and $b\_i$ are added as a classified bit string, as shown in FIG. 13. If 3 bits have been read in step S1301, 3 bits are shifted, and if 4 bits have been read in step 1301, 4 bits are shifted. In step S1303, it is determined whether the first bit is 1 or not. If the first bit is 0, the process proceeds to step S1304, where the variable sht is increased by 1 so as to shift by 1 bit. These steps are repeated until the first bit becomes 1, and then the process proceeds to step S1305. Finally, it is determined whether or not all the bits have been read in step S1306, and the process is completed if all the bits have been read. The processing of divided $f\_i$ and $b\_i$ is the same as step S502 shown in FIG. 5, and thus the corresponding description will be omitted.

Fourth Embodiment

Pre-calculation may be unnecessary depending on an input value e. For example, pre-calculation is unnecessary when the bit length is short (e=3, for example), or when the number of 1 in bits of a binary number is small (e=2^100, for example). By estimating the number of multiplications for an input value e, it can be determined whether or not pre-calculation is necessary, so that step S501 can be omitted. Also, when there is a plurality of methods of dividing e, a method to be adopted can be selected by estimating the number of multiplications. That is, by estimating the number of multiplications, it can be determined whether or not the exponent should be divided so as to perform calculation and how to divide the exponent.

In addition, when the number of multiplications is estimated, weighting can be effectively performed based on whether the multiplication is square calculation or not. According to High-Speed RSA Implementation, RSA Laboratories, 1994, the amount of calculation in square calculation is smaller than that in multiplication of different values. For example, square calculation is counted as 0.8 times, but multiplication of different values is counted as once.

Fifth Embodiment

Figure 14:
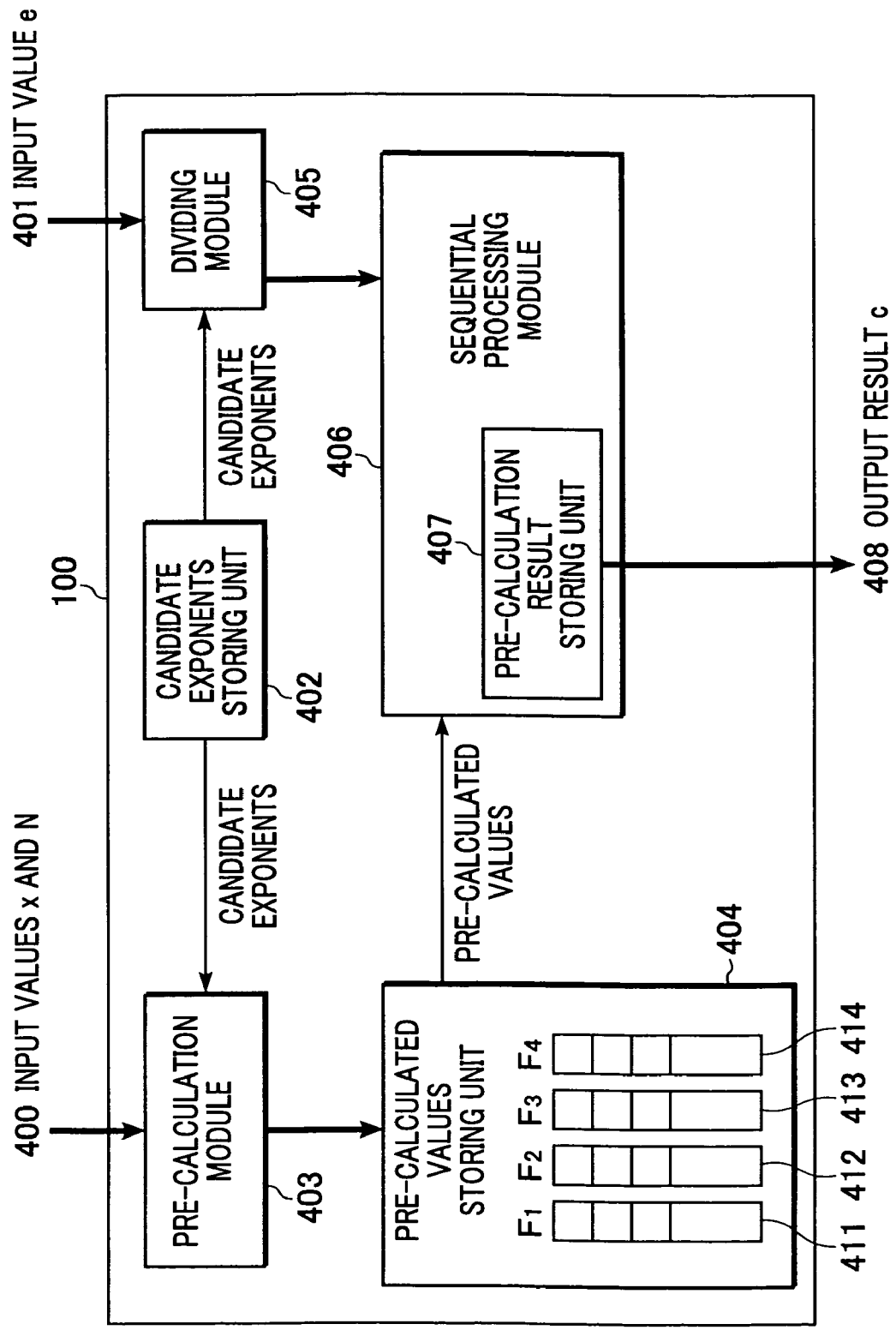
FIG. 14 is a block diagram showing a function structure of an information processor according to a fifth embodiment.

FIG. 14 shows a featured function of the information processor 100 shown in FIG. 1 (function of exponent calculation). As shown in FIG. 14, the information processor 100 includes the candidate exponents storing unit 402, the pre-calculation module 403, the pre-calculated values storing 404, the dividing module 405, the sequential processing module 406, and the pre-calculation result storing unit 407.

Each of the modules 403, 405, and 406 is a function unit (module) that can be realized when the CPU 103 executes a predetermined program.

Values x and N (400) and e (401) are input to the information processor 100. The information processor 100 performs modular exponent calculation by using the input values so as to output a result (408): $c=x^e \pmod N$. When the value N is not input, exponent calculation is performed so as to obtain $c=x^e$, which is an exceptional case in modular exponent calculation. In the fifth embodiment, modular exponent calculation for calculating $x^e \pmod N$, which is performed by the information processor 100, is described.

Binary numbers, such as (0), (1), (11), (101), (1011), (1101), (10101), (101011), (110101), ..., having a form of $1[01]_L$, $11[01]_L$, or $1[01]_L 1$ ($[xy]_i$ represents that xy is repeated i times), are stored in the candidate exponents storing unit 402 in advance.

The pre-calculation module 403 performs pre-calculation by using the input values (400) and the binary numbers stored in the candidate exponents storing unit 402, and stores the obtained result in the pre-calculated values storing unit 404 in the HD 106. On the other hand, the dividing module 405 divides the input value 401, and stores the input value 401 and the divided values in the HD 106. The sequential processing module 406 sequentially operates the pre-calculation result storing unit 407 in the HD 106 so as to store calculation result 408 in the HD 106. The calculation result 408 is output through the monitor 102, the FD drive 109, the network I/F 114, or the printer 115.

The information processor 100 having the configuration shown in FIG. 14 performs exponent calculation according to the flowchart shown in FIG. 5. For example, the CPU 103 reads and executes a processing program corresponding to the flowchart shown in FIG. 5. According to this program, the information processor 100 operates in the following way.

Step S500:
An input value e (bit length is k) is represented in binary notation: $\Sigma_{i=0,\ldots,k-1} 2^i * e\_i$ (e_i is 0 or 1). Input values x, N, and e are stored in the HD 106.

Step S501:
x^l_i for each of candidate exponents {l_i} (0≤i≤L−1), the number of the candidate exponents being L, stored in the candidate exponents storing unit 402, is pre-calculated by using the input values x and N, and calculation results are stored in the pre-calculated values storing unit 404.

Figure 18:
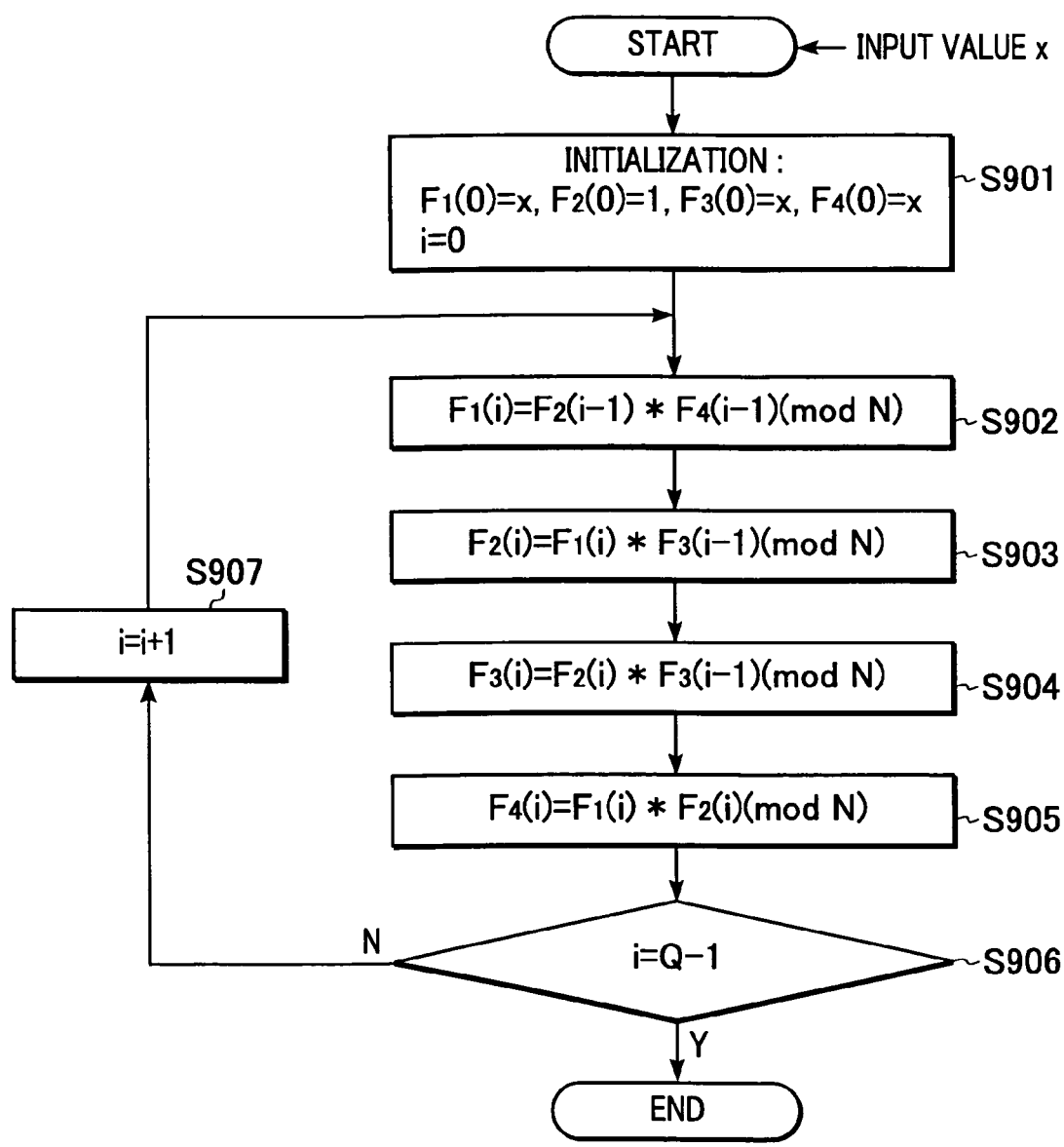
FIG. 18 is a flowchart showing a process of storing values in array regions.

The pre-calculated values storing unit 404 includes four array regions $F_1( )$, $F_2( )$, $F_3( )$, and $F_4( )$ (411 to 414) for storing values obtained by pre-calculation (length of each array is Q). FIG. 18 is a flowchart showing a process of storing values in the array regions 411 to 414.

First, in step S901, an initial value is set to each of the array regions: $F_1(0)=x$, $F_2(0)=1$, $F_3(0)=x$, and $F_4(0)=x$. Also, variable i is set to 0.

Then, in step S902, $F_1(i)=F_2(i-1)*F_4(i-1) \pmod N$ is stored. Likewise, $F_2(i)=F_1(i)*F_3(i-1) \pmod N$ is stored in step S903, $F_3(i)=F_2(i)*F_3(i-1) \pmod N$ is stored in step S904, and $F_4(i)=F_1(i)*F_2(i) \pmod N$ is stored in step S905. Then, in step S906, it is determined whether or not the variable i matches Q−1. If the variable i does not match Q−1, the variable i is increased by 1 in step S907, and then the process returns to step S902. If the variable i matches Q−1, the process is completed.

Steps S904 and S905 may be performed sequentially or in parallel. By performing a parallel operation, the processing speed can be increased.

Step S502:
The exponent e (bit length is k) is divided into a plurality of values {f_i} (0≤i≤F−1) so that each of the values {f_i} corresponds to one of the candidate exponents {l_i}. At this time, the exponent e is divided so that $k=\Sigma_{i=0,\ldots,F-1} b\_i$ is satisfied, where the bit length of f_i is b_i.

Step S503:
First, $C:=x^{f\_0} \pmod N$ is stored in the pre-calculation result storing unit 407. Then, the following processing is sequentially performed for every f_i (0≤i≤F−1). for i=1 to F−1
1) $C:=C^{2^{b\_i}} \pmod N$
2) if f_i≠0 then $C:=C*x^{f\_i} \pmod N$ Step S504:
Output value: $c=x^e \pmod N$, which has been obtained in step S503, is output.

Figures 15, 16:
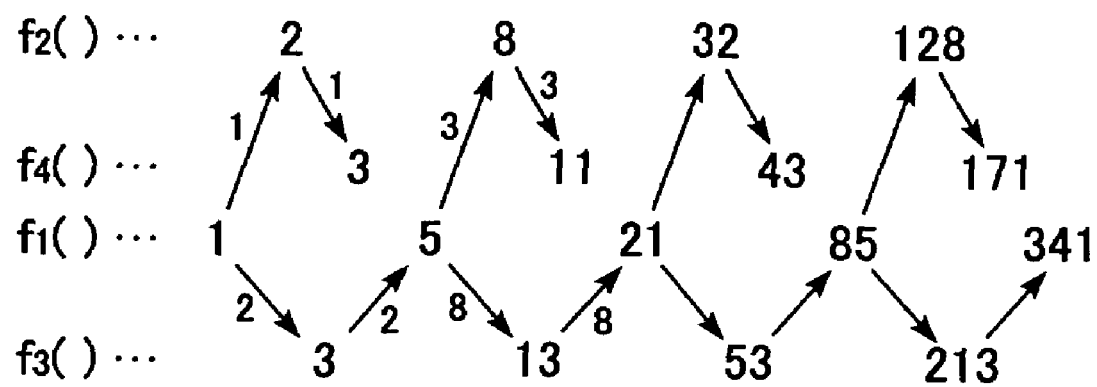
FIG. 15 shows a method for forming an addition chain in the fifth embodiment.
FIG. 16 shows an example of exponent division in the fifth embodiment.

FIG. 15 shows a method of forming an addition chain in this embodiment. As described above, the candidate exponents in binary notation have a form of $1[01]_L$, $11[01]_L$, or $1[01]_L 1$ ($[xy]_i$ represents that xy is repeated i times). A method of efficiently calculating the candidate exponents is described below.

Four functions $f_1( )$, $f_2( )$, $f_3( )$, and $f_4( )$ are initialized: $f_1(0)=1$, $f_2(0)=0$, $f_3(0)=1$, and $f_4(0)=1$. Then, calculation is circularly performed so as to satisfy $f_1(i)=f_2(i-1)+f_4(i-1)$, $f_2(i)=f_1(i)+f_3(i-1)$, $f_3(i)=f_2(i)+f_3(i-1)$, and $f_4(i)=f_1(i)+f_2(i)$. The calculation order is as follows:
$f_1(1) \to f_2(1) \to f_3(1) \to f_4(1) \to f_1(2) \to f_2(2) \to f_3(2) \to f_4(2) \ldots$
At this time, $f_1(i)=1[01]_i$, $f_2(i)=10[00]_i$, $f_3(i)=11[01]_i$, and $f_4(i)=1[01]_i 1$. In this way, an addition chain: {1, 2, 3, 5, 8, 11, 13, 21, 32, 43, 53, 85, 128, 171, 213, 314, ...} can be formed.

FIGS. 16 and 17 show an example of processing when the maximum bit length W of candidate exponents is 4 (that is, the candidate exponents are (1), (11), (101), (1011), and (1101)), and e=1101101110001010001. First, $x^{l\_i}$ for each of the candidate exponents {l_i} is calculated according to step S501 in FIG. 5. FIG. 16 corresponds to step S502 and shows that e is divided: f_0=(1101), f_1=(1011), f_2=(11), and so on. FIG. 17 shows a calculation process corresponding to step S503.

Sixth Embodiment

Figure 19:
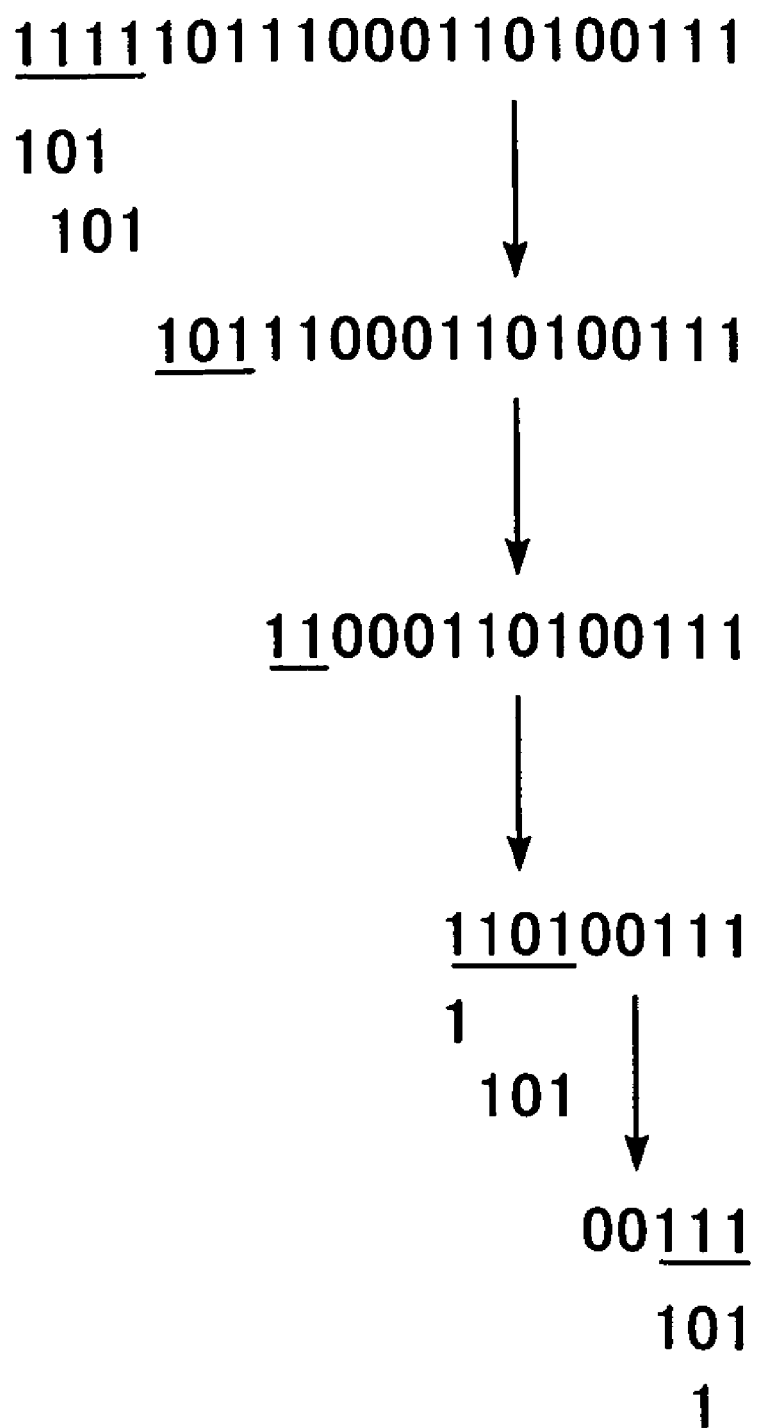
FIG. 19 shows an example of exponent division in a sixth embodiment.

In the fifth embodiment, the exponent e is divided so that bit strings of the divided values do not overlap each other. In the sixth embodiment, (10) in a bit string is divided into (01) and (01) so as to reduce the calculation amount, as in the third embodiment. FIG. 19 shows an example in which e=111110111000110100111 is divided according to the table in FIG. 12 and the flowchart in FIG. 13.

According to the above-described embodiments, it is estimated that bit strings having a predetermined feature appear in a bit string of e represented in binary notation. Then, pre-calculation is performed for only these bit strings, which are regarded as candidate exponents, so that the amount of pre-calculation can be reduced. Accordingly, an exponent calculation method in which fewer numbers of calculations are performed can be provided.

Also, the number of values to be pre-calculated is reduced. Therefore, the size of table for storing pre-calculated values can be reduced, and a memory region for referring to the table can be reduced.

Other Embodiments

The present invention may be applied to part of a system including a plurality of apparatuses (for example, host computer), or may be applied to part of an apparatus.

Also, software program codes for allowing various devices to operate so as to realize the functions of the above-described embodiments may be supplied to a computer in an apparatus connected to the various devices or a system. At this time, the various devices are operated according to the program stored in the computer (CPU or MPU) in the system or the apparatus.

In this case, the software program codes realize the functions of the above-described embodiments, and thus the program codes are included in the present invention. As transmission media of the program codes, communication media (wired system, such as optical fibers, and radio system) in a computer network system (LAN, WAN including the Internet, radio communication network, etc.) for propagating program information in a carrier can be used.

Further, a unit for supplying the program codes to the computer, for example, recording media storing the program codes, is included in the present invention. The recording media for storing the program codes include floppy disks, hard disks, optical disks, magneto-optical disks, CD-ROMs, magnetic tapes, nonvolatile memory cards, and ROMs.

The program codes are included in the present invention when the functions of the above-described embodiments are realized when the computer executes the supplied program codes, and when the functions of the above-described embodiments are realized when the program codes cooperate with the OS (operating system) operated in the computer or other application software.

Further, the supplied program codes may be stored in a memory provided in an expanded board of the computer or an expanded unit connected to the computer. Then, a CPU or the like in the expanded board or the expanded unit may execute part or whole of actual processing based on instructions of the program codes, so that the functions of the above-described embodiments are realized.

Although the present invention has been described in its preferred form with a certain degree of particularity, many apparently widely different embodiments of the invention can be made without departing from the sprit and the scope thereof. It is to be understood that the invention is not limited to the specific embodiments thereof except as defined in the appended claims.

What is claimed is:

1. An exponent calculation apparatus for encrypting or decrypting data by calculating $x^e$ based on two integers x and e, the apparatus comprising:
   an input unit for inputting the two integers x and e;
   a candidate exponents storing unit for storing candidate exponents $\{l\_i\}$ ($0 \leq i \leq L-1$), the number of the candidate exponents being L;
   a pre-calculation unit for pre-calculating $x^\wedge\{l\_i\}$ for each of the candidate exponents $\{l\_i\}$, which are stored in the candidate exponents storing unit, based on the input integer x;
   a pre-calculated values storing unit for storing the values $x^\wedge\{l\_i\}$ obtained by the pre-calculation;
   a dividing unit for dividing the input integer e into a plurality of values $\{f\_i\}$ ($0 \leq i \leq F-1$) so that each of the values $\{f\_i\}$ corresponds to one of the candidate exponents $\{l\_i\}$;
   a calculation result storing unit for storing a calculation result c;
   a sequential processing unit for sequentially updating the calculation result c for each of the divided values $\{f\_i\}$ ($0 \leq i \leq F-1$) by using each of the pre-calculated values $x^\wedge\{l\_i\}$; and
   an output unit for outputting the calculation result c for encrypting or decrypting data after the calculation result c is updated for all the values $\{f\_i\}$ as $x^e$.

2. An exponent calculation apparatus for encrypting or decrypting data by calculating $x^e$(mod N) based on three integers x, e, and N, the apparatus comprising:
   an input unit for inputting the three integers x, e, and N;
   a candidate exponents storing unit for storing candidate exponents $\{l\_i\}$ ($0 \leq i \leq L-1$), the number of the candidate exponents being L;
   a pre-calculation unit for pre-calculating $x^\wedge\{l\_i\}$ for each of the candidate exponents $\{l\_i\}$, which are stored in the candidate exponents storing unit, based on the input integer x;
   a pre-calculated values storing unit for storing the values $x^\wedge\{l\_i\}$ obtained by the pre-calculation;
   a dividing unit for dividing the input integer e into a plurality of values $\{f\_i\}$ ($0 \leq i \leq F-1$) so that each of the values $\{f\_i\}$ corresponds to one of the candidate exponents $\{l\_i\}$;
   a calculation result storing unit for storing a calculation result c;
   a sequential processing unit for sequentially updating the calculation result c for each of the divided values $\{f\_i\}$ ($0 \leq i \leq F-1$) by using each of the pre-calculated values $x^\wedge\{l\_i\}$; and
   an output unit for outputting the calculation result c for encrypting or decrypting data afther the calculation result c is update for all the values $\{f\_i\}$ as $x^e$(mod N).

3. The apparatus according to claim 2, wherein the sequential processing unit comprises:
   an initializing unit for setting $f\_0$, which is an initial value of the calculation result c, in the calculation result storing unit; and
   an updating unit for sequentially updating $c := c^2$ as many times as a number of a bit length of each of the divided values $\{f\_i\}$ ($0 \leq i \leq F-1$) in binary notation and updating $c := c * f\_i$.

4. The apparatus according to claim 2, wherein the candidate exponents stored in the candidate exponents storing unit have a form of (0) or $1[01]_L$ in binary notation, where $[xy]_i$ means that xy is repeated i times.

5. The apparatus according to claim 2, wherein the candidate exponents stored-in the candidate exponents storing unit have a form of (0), (11), or $1[01]_L$ in binary notation, where $[xy]_i$ means that xy is repeated i times.

6. The apparatus according to claim 2, wherein the dividing unit divides (10) in a bit string of the divided values represented in binary notation into (01) and (01) so that the values $\{f\_i\}$ may be overlapped, and, in an updating process of $c := c^2$ by the sequential processing unit, an overlapped portion of bit length of the values $f\_i$ is not updated.

7. The apparatus according to claim 2, further comprising:
   a multiplication number estimating unit for estimating the number of multiplications according to division performed by the dividing unit; and
   a division controlling unit for controlling division performed by the dividing unit based on the estimated number of multiplications.

8. The apparatus according to claim 7, wherein the multiplication number estimating unit estimates the number of multiplications by assigning different weights to multiplication of different values and multiplication of same values.

9. The apparatus according to claim 2, wherein the number L of the candidate exponents, which are stored in the candidate exponents storing unit, is increased or decreased depending on the bit length of the input value e.

10. The apparatus according to claim 2, wherein each of the candidate exponents stored in the candidate exponents storing unit is 0 or a binary number of W bits or less, and has a form $1[01]_L$, $11[01]_L$, or $1[01]_L1$, where $[xy]_i$ means that xy is repeated i times.

11. The apparatus according to claim 10,
wherein the pre-calculation unit uses four functions $f_1(\ )$, $f_2(\ )$, $f_3(\ )$, and $f_4(\ )$, which represent the candidate exponents,
sets initial values: $f_1(0)=1$, $f_2(0)=0$, $f_3(0)=1$, and $f_4(0)=1$,
performs circular calculation so as to satisfy $f_1(i)=f_2(i-1)+f_4(i-1)$, $f_2(i)=f_1(i)+f_3(i-1)$, $f_3(i)=f_2(i)+f_3(i-1)$ and $f_4(i)=f_1(i)+f_2(i)$ and obtains forms $f_1(i)=1[01]_i$, $f_2(i)=10[00]_i$, $f_3(i)=11[01]_i$, and $f_4(i)=1[01]_i1$ so as to form an addition chain,
calculates $x^{f1(i)}$ based on the product of $x^{f2(i-1)}$ and $x^{f4(i-1)}$, $x^{f2(i)}$ based on the product of $x^{f1(i)}$ and $x^{f3(i-1)}$, $x^{f3(i)}$ based on the product of $x^{f2(i)}$ and $x^{f3(i-1)}$, and $x^{f4(i)}$ based on the product of $x^{f1(i)}$ and $x^{f2(i)}$, and
stores the calculation result in the calculation result storing unit.

12. The apparatus according to claim 10,
wherein the calculation result storing unit includes four array regions $F_1(\ )$, $F_2(\ )$, $F_3(\ )$, and $F_4(\ )$ for storing calculation results and sets initial values $F_1(0)=x$, $F_2(0)=1$, $F_3(0)=x$, and $F_4(0)=x$, and
the pre-calculation unit performs circular calculation so as to satisfy $F_1(i)=F_2(i-1)*F_4(i-1)$, $F_2(i)=F_1(i)*F_3(i-1)$, $F_3(i)=F_2(i)*F_3(i-1)$, and $F_4(i)=F_1(i)*F_2(i)$ and stores the calculation result in the calculation result storing unit.

13. The apparatus according to claim 10, wherein the bit number W of each of the candidate exponents stored in the candidate exponents storing unit is changed in accordance with the bit number of the integer e.

14. A method for encrypting or decrypting data by calculating $x^e$ based on two integers x and e, the method comprising:
an input step of inputting the two integers x and e;
a pre-calculation step of pre-calculating $x^{\{l\_i\}}$ for each of candidate exponents $\{l\_i\}$ ($0 \leq i \leq L-1$) stored in a candidate exponents storing unit, the number of the candidate exponents being L, based on the input integer x, and storing the values $x^{\{l\_i\}}$ obtained by the pre-calculation in a pre-calculated values storing unit;
a dividing step of dividing the input integer e into a plurality of values $\{f\_i\}$ ($0 \leq i \leq F-1$) so that each of the values $\{f\_i\}$ corresponds to one of the candidate exponents $\{l\_i\}$;
a sequential processing step of sequentially updating a calculation result c, which is stored in a calculation result storing unit, for each of the divided values $\{f\_i\}$ ($0 \leq i \leq F-1$) by using each of the pre-calculated values $x^{\{l\_i\}}$; and
an output step of outputting the calculation result c for encrypting or decrypting data afther the calculation result c is update for all the values $\{f\_i\}$ as $x^e$.

15. A method for encrypting or decrypting data by calculating $x^e$(mod N) based on three integers x, e, and N, the method comprising:

an input step of inputting the three integers x, e, and N;
a pre-calculation step of pre-calculating $x^{\{l\_i\}}$ for each of candidate exponents $\{l\_i\}$ ($0 \leq i \leq L-1$) stored in a candidate exponents storing unit, the number of the candidate exponents being L, based on the input integer x, and storing the values $x^{\{l\_i\}}$ obtained by the pre-calculation in a pre-calculated values storing unit;
a dividing step of dividing the input integer e into a plurality of values $\{f\_i\}$ ($0 \leq i \leq F-1$) so that each of the values $\{f\_i\}$ corresponds to one of the candidate exponents $\{l\_i\}$;
a sequential processing step of sequentially updating a calculation result c, which is stored in a calculation result storing unit, for each of the divided values $\{f\_i\}$ ($0 \leq i \leq F-1$) by using each of the pre-calculated values $x^{\{l\_i\}}$; and
an output step of outputting the calculation result c for encrypting or decrypting data afther the calculation result c is update for all the values $\{f\_i\}$ as $x^e$(mod N).

16. A computer-readable program stored in a computer-readable storage medium, for encrypting or decrypting data by allowing a computer to execute exponent calculation for calculating $x^e$ based on two integers x and e, said program comprising codes for causing the computer to perform:
an input step of inputting the two integers x and e;
a pre-calculation step of pre-calculating $x^{\{l\_i\}}$ for each of candidate exponents $\{l\_i\}$ ($0 \leq i \leq L-1$) stored in a candidate exponents storing unit, the number of the candidate exponents being L, based on the input integer x, and storing the values $x^{\{l\_i\}}$ obtained by the pre-calculation in a pre-calculated values storing unit;
a dividing step of dividing the input integer e into a plurality of values $\{f\_i\}$ ($0 \leq i \leq F-1$) so that each of the values $\{f\_i\}$ corresponds to one of the candidate exponents $\{l\_i\}$;
a sequential processing step of sequentially updating a calculation result c, which is stored in a calculation result storing unit, for each of the divided values $\{f\_i\}$ ($0 \leq i \leq F-1$) by using each of the pre-calculated values $x^{\{l\_i\}}$; and
an output step of outputting the calculation result c for encrypting or decrypting data afther the calculation result c is update for all the values $\{f\_i\}$ as $x^e$.

17. A computer-readable program stored in a computer-readable storage medium, for encrypting or decrypting data by allowing a computer to execute exponent calculation for calculating $X^e$(mod N) based on three integers x, e, and N, said program comprising codes for causing the computer to perform:
an input step of inputting the three integers x, e, and N;
a pre-calculation step of pre-calculating $x^{\{l\_i\}}$ for each of candidate exponents $\{l\_i\}$ ($0 \leq i \leq L-1$) stored in a candidate exponents storing unit, the number of the candidate exponents being L, based on the input integer x, and storing the values $x^{\{l\_i\}}$ obtained by the pre-calculation in a pre-calculated values storing unit;
a dividing step of dividing the input integer e into a plurality of values $\{f\_i\}$ ($0 \leq i \leq F-1$) so that each of the values $\{f\_i\}$ corresponds to one of the candidate exponents $\{l\_i\}$;

a sequential processing step of sequentially updating a calculation result c, which is stored in a calculation result storing unit, for each of the divided values $\{f\_i\}$ ($0 \leq i \leq F-1$) by using each of the pre-calculated values $x^{\{l\_i\}}$; and an output step of outputting the calculation result c for encrypting or decrypting data afther the calculation result c is update for all the values $\{f\_i\}$ as $x^e \pmod N$.

* * * * *